July 31, 1945.　　　R. E. EAVES　　　2,380,508
EYE EXERCISING DEVICE
Filed May 8, 1943　　　3 Sheets-Sheet 1

Inventor.
Ralph E. Eaves
by Heard Smith & Tennant
Attys.

Inventor.
Ralph E. Eaves
by Heard Smith & Tennant.
Attys.

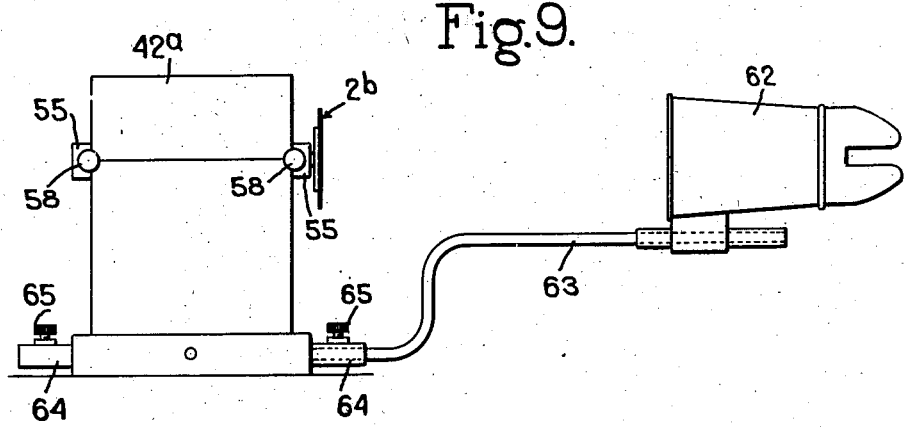
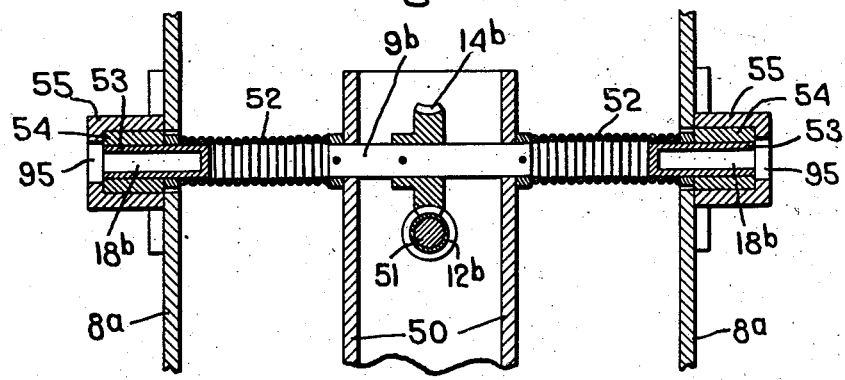
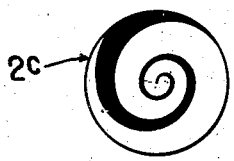
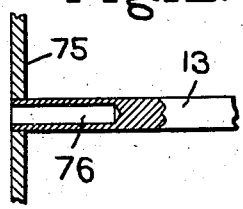
Inventor.
Ralph E. Eaves

Patented July 31, 1945

2,380,508

UNITED STATES PATENT OFFICE 2,380,508

EYE EXERCISING DEVICE

Ralph E. Eaves, Westwood, Mass.

Application May 8, 1943, Serial No. 486,237

5 Claims. (Cl. 128—76.5)

This invention relates to eye exercising devices, and it has for one of its objects to provide a device of this type by which defects in vision, and especially nearsightedness or farsightedness, may be reduced and in some cases entirely corrected.

A further object of the invention is to provide a device of this type having a revolving target which may be operated so as to produce in the observer the illusion of either a receding or an advancing target.

When the device is operated to produce the illusion of a receding target, the eye muscles of an observer looking at the target involuntarily function as they would in maintaining a focus on an object that is moving away from him, in other words, the eye muscles will tend to focus the eye on a point beyond the target, and the target will appear slightly smaller than it actually is. When the operation of the target suddenly ceases, the eye muscles will again involuntarily readjust themselves so as to focus the eyes on the then stationary target, and the target will appear to expand somewhat.

On the other hand, when the device is operated to produce the illusion of a target that is approaching the observer, his eye muscles will involuntarily function as they would in maintaining a focus on an object that is approaching him, in other words, the eyes will tend to be focused on a point between the observer and the target, and the target will appear to be slightly larger than it actually is.

When the operation of the target suddenly ceases, the eye muscles will involuntarily again adjust themselves so as to focus on the then stationary target, and the latter will appear to shrink slightly.

For treating the eyes to correct or reduce nearsightedness, the target will be operated to produce the illusion of a receding target, and the patient will watch the target closely for a short period of say twenty or thirty seconds, and then the target will be brought to rest with the results above referred to. By repeating this operation frequently, the muscles of the eyes are exercised in such a way as to tend to reduce or correct nearsightedness.

For treatment of persons whose defective vision is farsightedness, the device will be operated to produce the illusion of a target that is approaching the observer, and the patient will look steadily at the target for a short interval of time while it is thus operated, and then the target will be brought to rest with the results also above referred to. By repeating this procedure at frequent intervals, the muscles of the eye will be strengthened in a way which will tend to correct farsightedness.

A further object of the invention is to provide a novel device for treating patients having eyes with unequal retinal images for the purpose of increasing or decreasing the size of the retinal image of either eye, thereby inducing a tendency to equalize the size of the two retinal images.

A still further object of the invention is to provide a novel device for exercising and strengthening the muscles of the eyes to counteract the tendency of either eye to turn inward or outward.

A still further object of the invention is to provide an improved eye exercising device having various novel features which will be more fully hereinafter set forth.

I have illustrated in the drawings some selected embodiments of my invention which will now be described after which the novel features will be pointed out in the appended claims.

In the drawings:

Fig. 9 is a view illustrating the apparatus used in connection with a stereoscope.

Fig. 10 is an enlarged fragmentary sectional view illustrating the shaft 9b.

Fig. 11 is a view of a different form of target from that shown in Fig. 5.

Fig. 12 is a fragmentary sectional view through the end of the motor shaft 13 in Fig. 2.

Figure 1:
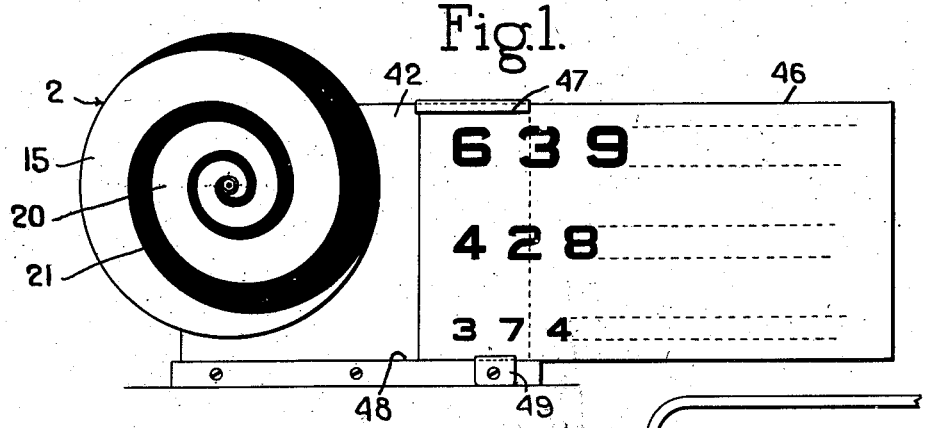
Fig. 1 is a side view of a device embodying the invention.

In the embodiment of the invention shown in Figs. 1-4, the revolving target is indicated at 2, and the mechanism by which the target is supported and is given its rotary movement is carried by a suitable base 3 which may be of any suitable insulating material. Mounted on this base 3 is a supporting frame 4 which is formed with a foot portion 5 that rests on the base and is secured thereto and is also formed with an upright portion 6 to which is secured a motor 7 by which the target 2 may be rotated at a substantially uniform speed. The upright portion 6 of the supporting frame is also formed with two vertically extending wings 8 in which is mounted a target-supporting shaft 9, said shaft finding bearings in each of the wings 8 and having its ends projecting slightly beyond the wings.

Each wing 8 has rigid therewith a hub 10 through which the target-supporting shaft 9 extends and in which it is rotatably mounted. As stated above, the shaft projects at each end slightly beyond the wings 8, and each projecting end has fast thereon a collar 11 which engages the outside of the wings.

Provision is made so that the target 2 may be removably mounted on either end of the shaft 9, as will be presently described.

Any suitable driving connection between the motor 7 and the shaft 9 may be provided, but I will prefer to use the worm and gear driving connection herein illustrated and which includes a worm 12 on the extension 13 of the motor shaft and a worm gear 14 on the shaft 9 which meshes with and is driven by the worm 12. This not only provides a suitable driving connection between the motor and the target but also it provides a reduction gearing by which the target will be rotated at the desired speed.

The target 2 comprises a disk 15 carrying a special design on its face and which is mounted on a hub 16 that is provided with a spindle 17 adapted to enter an axial bore 18 in the end of the shaft 9. The spindle 17 is made resilient radially so that when it is inserted into the bore 18, it will have sufficient frictional engagement with the walls of the bore to cause the target to rotate with the shaft 9. The target and the hub 16 on which it is mounted may, however, be readily removed from the shaft 9 by withdrawing the resilient spindle from the bore 18.

The hub 16 is provided with a shoulder 19 which by its engagement with the end of the shaft determines the position of the target when it is mounted on the shaft. The shaft 9 is provided at each end with a spindle-receiving bore 18 so that the target may be mounted on either end of the shaft as seen by the full and dotted lines in Fig. 2.

Figure 5:
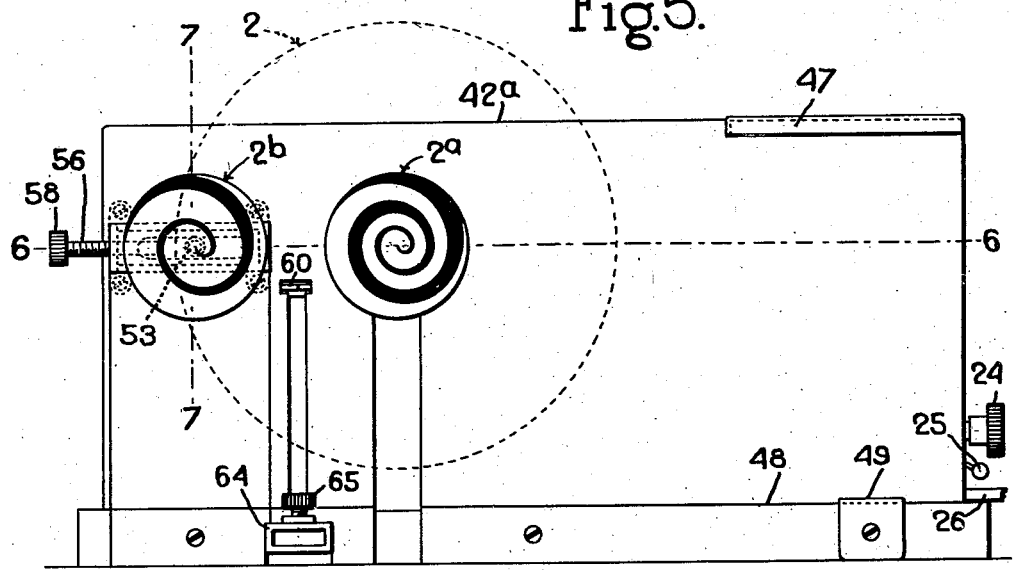
Fig. 5 is a side view of a different embodiment of my invention.

The target has a design on its face such as shown in Figs. 1 and 5 and which comprises a spiral shaped band 21 which spirals from the center of the disk outwardly to the periphery, said band having a gradually increasing width from the center toward the periphery. This band is of a color which contrasts with the color of the face of the disk. I will preferably use a black band on a white disk, but any other two contrasting colors might be used. The number of turns in the spiral band may be varied depending on the effect which it is desired to produce. The target shown in Fig. 1 has a spiral band of three turns, and the band not only has a progressively increasing width from its inner end to its outer end at the periphery of the disk, but the inner end of the band tapers to a point which is located at the true center of the disk. The rate of uniform increase in the width of the band 21 from its pointed inner end to its outer end may vary somewhat, but it is highly desirable that the increase in width should be such that the arcuate line along which the periphery of the disk cuts the band at the outer end should subtend a relatively wide angle. In Figs. 1 and 5 of the drawings, this arcuate line subtends an angle of somewhat more than 90°, but the size of such angle will vary somewhat depending upon the number of turns in the spiral.

When the target 2 is rotated counterclockwise in Fig. 1 at the proper speed, the scroll or spiral shape of the band 21 produces the illusion in the observer of a target which is receding from him. The speed of apparent receding movement depends on the number of turns in the spiral of the band 21, a spiral of three turns, for instance, producing a faster apparent receding movement than a spiral of fewer turns, assuming, of course, that the targets are rotating at the same speed. This apparent receding movement is enhanced by the progressively increasing width of the band from its pointed inner end to its outer end, where it runs off the periphery of the target and also by the fact that the inner pointed end of the band is located at the center of rotation of the target while the periphery of the target cuts the outer wide end of the band along an arcuate line which subtends a relatively wide angle.

This apparent receding movement of the target causes the muscles of the eye to involuntarily function in the same way that they would in focusing the eyes on an object which is moving away from the observer, or in other words, the involuntary action of the eye muscles caused by looking at the apparently receding target produces the same effect as if the eyes were focused on an object situated beyond the target.

If after watching the rotating target for a short while, say twenty or thirty seconds, the target is suddenly brought to rest while the patient is still looking at it, the eye muscles will naturally and involuntarily readjust themselves so as to focus the eyes on the stationary target which is at a point nearer the observer than that on which the eyes were focused when watching the apparently receding target, and the target will appear to have a radially expanding movement. By repeating this operation at more or less frequent intervals, the exercise which is thus given to the muscles of the eyes will be such as to tend to correct nearsightedness.

On the other hand, if the target is rotated clockwise in Fig. 1, it will give the observer the impression of a target moving toward him, and as the patient watches this rotating target, his eye muscles will involuntarily function as they would if they were looking at a forwardly moving target. In other words, the readjustment of the eye muscles while looking at the rotating target is such as to tend to focus the eyes on a point between the actual target and the patient. If after looking at the rotating target for a short period of time, say twenty or thirty seconds, the target is suddenly brought to rest while the patient is still looking at it, the patient's eyes will then automatically readjust themselves to focus on the stationary target, and the target will appear to shrink slightly in diameter.

By repeating this operation at more or less frequent intervals, the exercise which is thus given to the muscles of the eye will be such as to tend to correct far-sightedness.

One way of providing for rotating the target either counterclockwise or clockwise is by making the shaft 9 with the spindle-receiving socket 18 in each end so that the target may be placed on either end of the shaft.

If it be assumed that the shaft 9 is geared so as to rotate counterclockwise in Fig. 1, then when the motor is operated, the target will have its counterclockwise rotation. By shifting the target to the other end of the shaft and turning the base around so as to present the other side to the observer, the rotation of the shaft will be such as to give the target a clockwise rotation.

While any suitable controls may be used for operating the motor, I have herein shown a switch device 22 which may have any suitable construction, and by which the motor circuit can be opened or closed. When the motor circuit is opened, the target will quickly come to rest. I have also shown a rheostat 23 by which the speed of the motor can be controlled, said rheostat having a thumb piece 24 by which it may be operated. The circuit wires are shown as being led to the device through a cable 26, one wire 27 of which is connected by a wire connection 28 to one terminal 29 of the motor 7. The other terminal 30 of the motor is connected by a wire connection 31 with one of the terminals 32 of the switch 22, the other terminal 33 of said switch being connected by the wire connections 34, 35 to one terminal 36 of the rheostat 23. The other terminal 38 of the rheostat is connected to the other wire 37 of the cable 26.

I have also shown an outlet receptacle 39 connected in the motor circuit which is designed to receive an ordinary plug 40 by which an electric light or any other desired apparatus can be plugged into the circuit. The wire connections 27, 28 are connected to one terminal 41 of this outlet receptacle, and the wire connections 34, 35 are connected to the other terminal 42 thereof, and hence when the plug 40 is plugged into the receptacle 39, the lamp or other device to which the plug 40 is connected will be in parallel with the motor but in series with the rheostat. With this arrangement, the switch 22 can be used for opening and closing the motor circuit without affecting the operation of the lamp or other apparatus which is plugged into the circuit by means of the plug 40. The rheostat 23, however, can be used to regulate the amount of current supplied through the outlet receptacle 39 even when the switch 22 is open.

42 indicates a casing or cover member adapted to be removably secured to the base 3 and designed to enclose the various parts of the apparatus with the exception of the target 2. This casing is provided with openings 92 in line with the ends of the shaft 9 to permit the target to be mounted on either end of said shaft, and the casing is also provided with slots 43, 44 through which the stem of the rheostat thumb piece 24 and the switch arm 25 extend, said slots extending to and being open at the bottom of the casing to permit the latter to be removed or replaced. The casing will also have a suitable opening 45 in line with the outlet receptacle 39.

The casing or cover member 42 is provided with means for holding a Snellen chart 46, that herein shown having three lines of figures thereon with the figures in each line of a different size. The casing 42 is formed at one end with an overhanging lip 47 to embrace the top edge of the chart 46, the lower edge of the chart resting on the shoulder 48 and being held in place by the clip 49.

During the use of the apparatus as above described, the patient may occasionally test his eyes by means of the Snellen chart in order to determine what improvement has been made in his vision.

Figure 6:
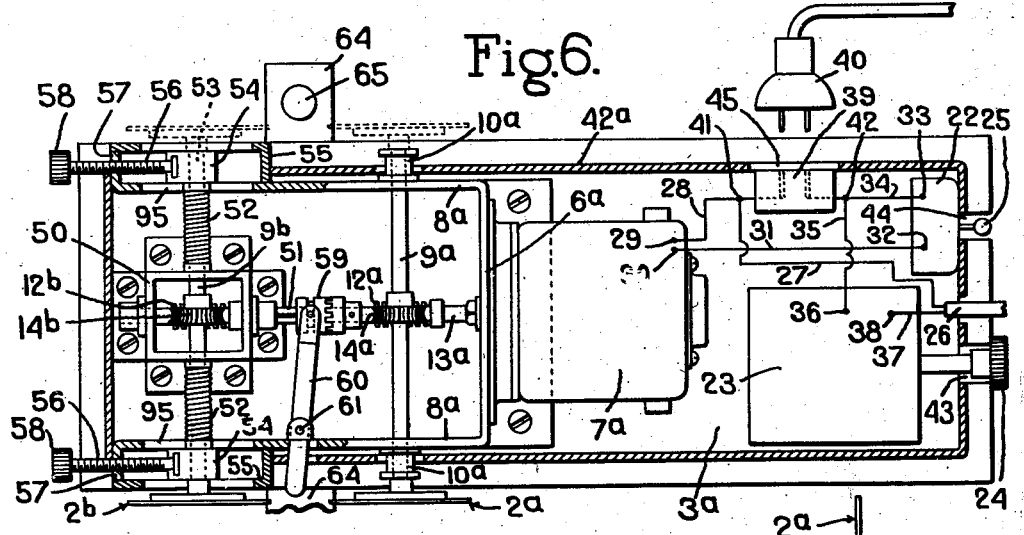
Fig. 6 is a section on the line 6—6, Fig. 5.
Figures 7, 8:
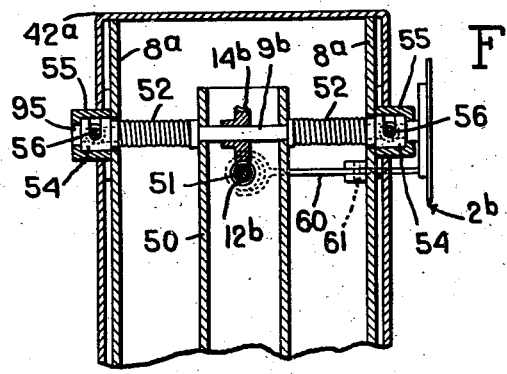
Fig. 7 is a fragmentary section on the line 7—7, Fig. 5.
Fig. 8 is a side view of one of the targets removed from the machine.

In Figs. 5-7, I have illustrated a different embodiment of the invention which can be used not only for the same purpose as the device shown in Figs. 1-4, but can also be used to reduce inequalities in the retinal images of the two eyes, and further to strengthen the eye muscles and associated visual centers in a way to reduce any tendency for either eye to deviate from its correct line of vision.

In this embodiment of the invention, there is provided a target-supporting shaft 9a having a construction similar to the shaft 9 in Figs. 1-4 and which is rotatively mounted in bearings 10a carried by the wings 8a of a supporting frame 6a that is mounted on a suitable base 3a. Secured to the frame 6a is a motor 7a by which the shaft 9a can be rotated, the shaft 13a of the motor having mounted thereon a worm 12a which meshes with a worm gear 14a on the shaft 9a, this construction being similar to that illustrated in Figs. 1-4. The shaft 9a is provided at each end with an axial recess similar to the recess 18 in the ends of the shaft 9 shown in Fig. 4 and adapted to receive the spindle of a target.

In the device of Figs. 5-7, there is provided a second target-carrying shaft 9b which is parallel to the shaft 9a, and is spaced therefrom a distance equal to the normal distance between the sight openings of a stereoscope. Means are provided for rotating the target-supporting shaft 9b synchronously with and in the same direction as the shaft 9a, said shaft 9b being provided at each end with an axial recess 18b to receive the spindle of a target.

The shaft 9b is shown as mounted in bearings carried by a hollow post 50 secured to and rising from the base 3a. The motor shaft 13a is formed with an extension 51 which is also journaled in said hollow post 50. This shaft extension 51 carries a worm 12b which meshes with a worm gear 14b on the shaft 9b, the worm and gear 12b, 14b being such as to rotate the shaft 9b at the same speed as that at which the shaft 9a rotates.

Figure 2:
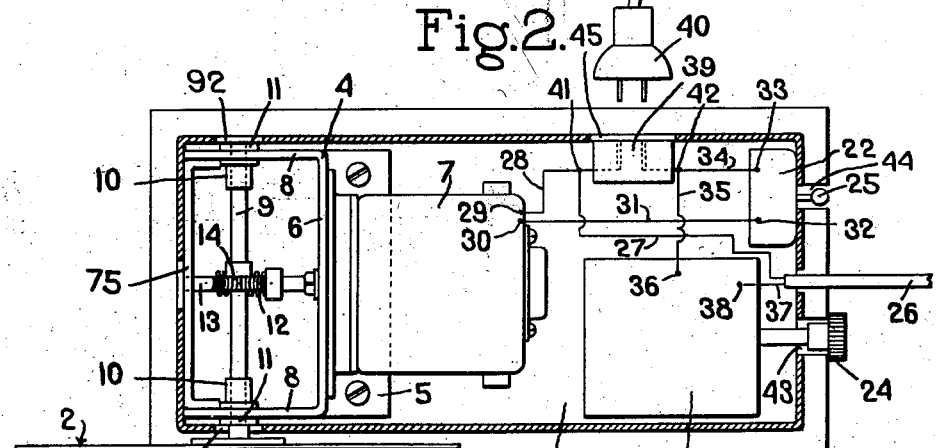
Fig. 2 is a horizontal sectional view of Fig. 1.
Figures 3, 4:
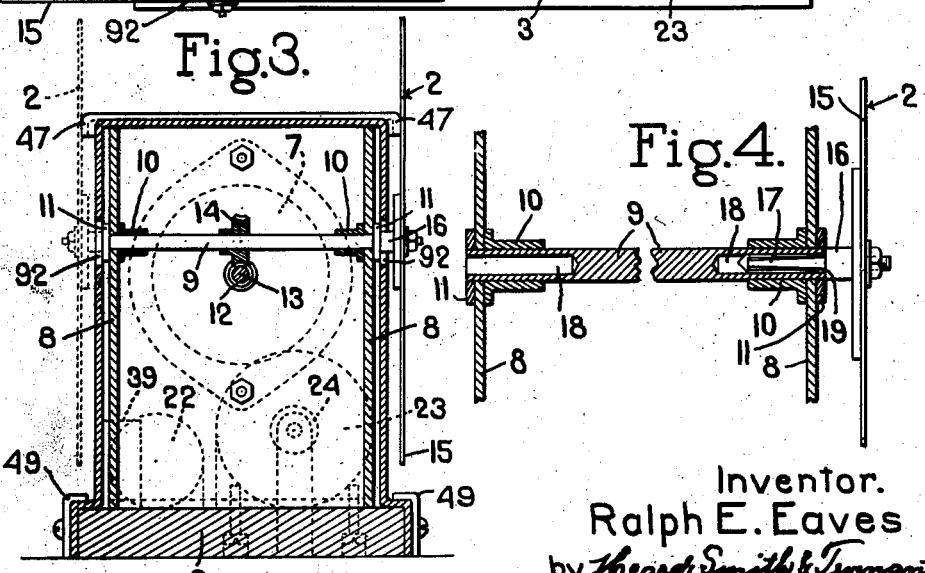
Fig. 3 is a vertical sectional view of Fig. 2 taken through the axis of the rotating target.
Fig. 4 is a fragmentary detail view.

When both shafts are used, the targets which are carried by the shafts will be much smaller than the target illustrated in Figs. 1 and 2. Two of these smaller targets are indicated at 2a and 2b in Fig. 5, and one of these targets is shown in side view in Fig. 8. Each target is provided with a stem or spindle 17a or 17b which is adapted to frictionally fit within the axial recess in one of the shafts 9a or 9b, such spindle being resilient radially so that it will have the proper friction grip with the walls of the recess.

Provision is made whereby the two targets 2a, 2b, one supported by the shaft 9a and the other by the shaft 9b, can be adjusted toward and from each other for a purpose hereinafter set forth. In order to accomplish this, I have provided the shaft 9b with two flexible portions 52, one on either side of the central portion of the shaft. The end portions 53 of the shaft 9b in which the spindle-receiving recesses 18b are formed are rigid and are connected to the central rigid portion by the flexible sections 52. Each rigid end portion 53 is journaled in a bearing box 54 which is mounted in a housing 55 to have a horizontal sliding movement toward and from the shaft 9a. Each box 54 has swiveled to it an adjusting screw 56 which has screw threaded engagement with the portion 57 of the supporting frame and which is provided with the knurled thumb piece 58. By rotating either adjusting screw 56, the corresponding box 54 may be moved in the housing 55 toward and from the shaft 9a, thereby varying the distance between the targets. Each side wall of the housing is formed with a slot 95 through which the axial recess 18b in the corresponding end of the shaft 9b is accessible for the purpose of mounting a target on said shaft 9b.

I have provided herein a clutch 59 by which the motor shaft extension 51 can be clutched to or unclutched from the motor shaft 13a, said clutch being operated by a suitable clutch lever 60 pivoted at 61, and accessible from the outside of the casing 42a which encloses the operative parts.

When the clutch 59 is disengaged, the shaft 9a only will be rotated by the motor, and the device may then be used with a large target in the same way as has been described with reference to Figs. 1–4.

For correcting unequal retinal images in the two eyes of a patient, the device of Figs. 5–7 will be used with the two small targets 2a, 2b mounted on the two shafts 9a, 9b, and in this case the clutch 59 will be engaged so that both targets will be rotating in unison. The two target arrangement shown in Figs. 5–7 is intended to be used in connection with a stereoscope 62 through which the patient views the target. This stereoscope may be supported in any convenient way at the proper distance from the targets, and merely for illustrative purposes, I have shown the stereoscope as carried by a bracket arm 63 which is removably mounted in a boss 64 carried by the base of the machine, said bracket being clamped in the boss by a set screw 65. When the patient views the targets 2a, 2b through the stereoscope 62, the right eye of the patient will see only the target 2a and the left eye of the patient will see only the target 2b, but if these targets are properly spaced apart and neither eye of the patient has any deviation from the correct line of vision, the two targets will appear to be superposed one on the other, or in other words, a single target will be seen.

In order to correct unequal retinal images in the two eyes, the targets 2a, 2b which are used may each have a different number of turns in the spiral. For instance, one target may have a spiral of two turns in its black band and the other target a spiral of three turns. With the two shafts 9a, 9b rotating in the same direction and at the same speed, the target with the three-turn spiral will appear to be receding from the patient faster than the target with the two-turn spiral. When the two targets are looked at through the stereoscope, the muscles of each eye will involuntarily adjust themselves to the apparent receding movement of the target which it sees, one eye attempting to focus on a point at a greater distance from the patient than the other eye.

The muscles of the two eyes will thus be exercised in a way tending to correct unequal retinal images. In the construction shown in Fig. 5, the target 2a is shown as a spiral band which makes three turns, while the target 2b has a spiral band which makes two turns only.

Since the targets are interchangeable, it is possible to use on each shaft a target having a spiral of any desired number of turns.

These small targets may be used on either end of the shafts 9a, 9b depending on whether the illusion to be produced is that of a receding target or of an approaching target.

For using the device to correct a slight tendency of either eye to turn inwardly or outwardly, the patient will look at two rotating targets mounted on the shafts 9a, 9b through a stereoscope, and the targets may be adjusted toward or from each other so as to bring the two targets which the two eyes see independently into a superposed relation. The targets may then be adjusted slightly away from each other if one eye of the patient tends to turn inwardly and may be adjusted slightly toward each other if one eye of the patient tends to turn outwardly. Such adjustment of the targets will result in the patient's seeing two targets which, however, may have an overlapping relation. The natural tendency of the two eyes of the patient to bring the two retinal images of the two targets into an exact superposed relation so that he sees a single target will produce a strengthening exercise of the eye muscles and associated visual centers that helps correct the deviation from the correct line of vision.

If either eye of the patient has a marked deviation from the correct line of vision, then it may be necessary to use a corrective lens in connection with the stereoscope to bring initially the images of the two retinal targets into their superposed relation, after which the two targets may be adjusted slightly relative to each other to give the eye muscles the exercise involved in the natural tendency of the two eyes to fuse into one image the two target images which are formed on the retinas of the two eyes.

The targets which are used as above described may have any desired design on their face. If the eyes of the patient have unequal retinal images as well as deviation, then targets such as shown in Fig. 5 may be used, one target having a different number of turns in the spiral than the other. But if the patient does not have unequal retinal images, then the two targets used may have spirals of the same number of turns.

The motor shaft 13 shown in Fig. 2 has a target-receiving recess in its end similar to the recess 18 in the shaft 9, said recess in the shaft 13 being exposed through an opening 90 formed in the casing 42. This provides for mounting a target directly on the motor shaft which may be used to test the speed of vision of a patient. In making this test the speed of the motor 7 can be controlled by the rheostat 23 so that the target will have the proper speed of rotation.

In Fig. 11, there is shown a target 2c in which the spiral band spirals from the center to the periphery in the opposite direction from that shown in Figs. 1 and 5. For some purposes, it may be desirable to use the target such as shown in Fig. 11 either by itself or in connection with a target such as shown in Figs. 1 and 5.

I claim:

1. A device of the class described comprising a base, a target-supporting shaft mounted thereon and having an axial recess in each end, a target having a spindle adapted to be inserted into either recess, said target having on its face a spiral shaped band which spirals from the center of the target outwardly to the periphery and which has a progressively increasing width from the center to the periphery, and means to rotate the shaft at a uniform speed in one direction only, whereby when the target is on one end of the rotating shaft it presents the illusion of a receding target and when it is on the other end of said rotating shaft it presents the illusion of an approaching target.

2. A device of the class described comprising a rotary target having on its face a spiral shaped band which spirals from the center of the target outwardly to the periphery, said band having a pointed inner end, the point of which is located at the true center of rotation of the target and also having a progressively increasing width from its pointed end to the periphery of the target, a target-supporting shaft on which the target is removably mounted, and means to rotate said shaft at a uniform speed.

3. A device of the class described comprising a rotary target having on its face a spiral shaped band which spirals from the center of the target outwardly to the periphery, said band having a pointed inner end, the point of which is located at the true center of rotation of the target and also having a progressively increasing width from its pointed end to the periphery of the target, said band at its outer end being of sufficient width so that the arcuate line on which it is cut by the periphery of the disk subtends an angle of at least 60°.

4. A device of the class described comprising a base, a rigid shaft rotatably mounted thereon, a second shaft also rotatably mounted on the base and extending substantially parallel to said rigid shaft, said second shaft having two rigid sections connected by a flexible section, one of said rigid sections being at the end of the shaft and constituting a target-carrying section, means to rotate the rigid shaft at a uniform speed, means including a clutch for operatively connecting said rigid shaft to the other rigid section of said second shaft, and means for adjusting the target-carrying rigid section of said second shaft toward and from the first-named shaft.

5. A rotary target for use in a device for exercising the muscles of the human eye, said target comprising a circular disk having on its face a spiral shaped band which spirals from the center of the target outwardly to the periphery, said band having a pointed inner end, the point of which is located at the true center of the target and also having a progressively increasing width from its pointed end to the periphery of the target, a hub member located at the center of the target on which the latter is rigidly mounted, and a radially resilient spindle extending axially of the hub member and adapted to be inserted into an axial bore of a target rotating shaft for removably mounting said target on the shaft.

RALPH E. EAVES.